(12) United States Patent
Tsuboi

(10) Patent No.: US 6,529,151 B2
(45) Date of Patent: Mar. 4, 2003

(54) MEASURING APPARATUS AND METHOD WHICH DELIVERS A SIGNAL INDICATIVE OF A MEASURED VALUE TO AN EXTERNAL SIGNAL DEVICE VIA A SIGNAL LINE

(75) Inventor: Masashi Tsuboi, Ebina (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/836,381

(22) Filed: Apr. 17, 2001

(65) Prior Publication Data

US 2001/0037188 A1 Nov. 1, 2001

(30) Foreign Application Priority Data

Apr. 18, 2000  (JP) ........................................ 2000-116341

(51) Int. Cl.$^7$ .............................................. H03M 1/66
(52) U.S. Cl. ...................................... 341/144; 341/151
(58) Field of Search .................................. 341/144, 151

(56) References Cited

U.S. PATENT DOCUMENTS

| | | | |
|---|---|---|---|
| 3,245,073 A | * | 4/1966 | Strunk et al. ............... 341/151 |
| 4,021,714 A | * | 5/1977 | Jones et al. ................. 318/661 |
| 4,099,113 A | | 7/1978 | Hayashi |
| 4,410,951 A | | 10/1983 | Nakamura et al. |
| 5,455,498 A | * | 10/1995 | Kakimoto et al. .......... 341/116 |

FOREIGN PATENT DOCUMENTS

| | | |
|---|---|---|
| EP | 0443552 A2 | 8/1991 |
| JP | 2001-44833 | 2/2001 |

* cited by examiner

*Primary Examiner*—Howard L. Williams
(74) *Attorney, Agent, or Firm*—Frishauf, Holtz, Goodman & Chick, P.C.

(57) ABSTRACT

There is provided a measuring apparatus that is constructed such that an analog signal indicative of the difference between a target value and a measured value obtained by a gauge is outputted to an external device via a single signal line, while securing a required resolution over the whole measuring range of the gauge. A counter as the measuring apparatus stores target values set in advance to respective different values covering the whole measuring range of the gauge, in a plurality of target value-setting registers, selects a target value-setting register from the plurality of target value-setting registers by a selector, calculates the difference between a target value stored in the selected target value-setting register and a count value measured by a pulse signal from the gauge, by a calculation circuit, and converts the calculated difference (digital output data) to an analog voltage signal by a D/A converter in a data output circuit, followed by outputting the analog voltage signal. The analog voltage signal outputted from the D/A converter is delivered to a sequencer via the single signal line.

8 Claims, 6 Drawing Sheets

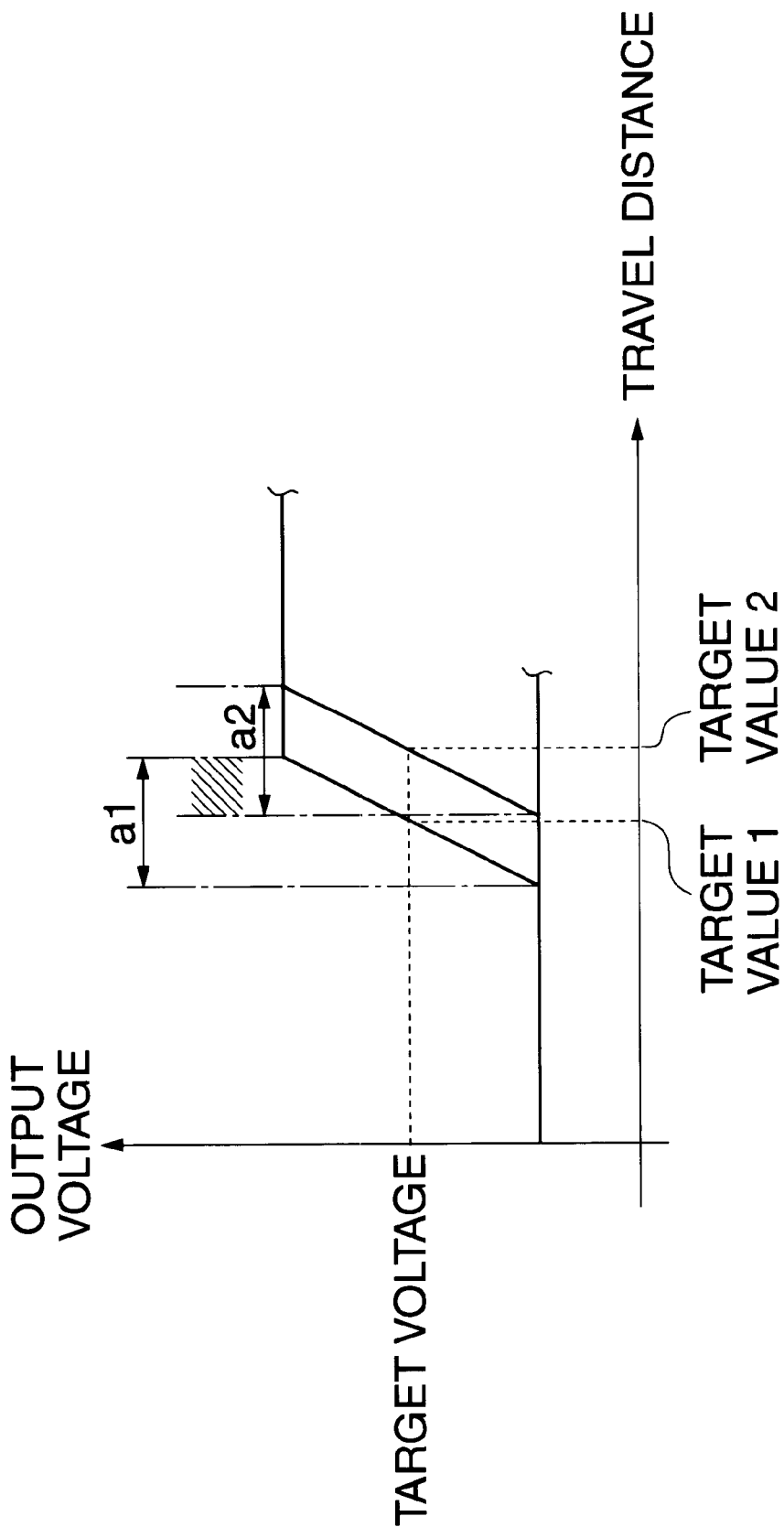

MEASURING APPARATUS AND METHOD WHICH DELIVERS A SIGNAL INDICATIVE OF A MEASURED VALUE TO AN EXTERNAL SIGNAL DEVICE VIA A SIGNAL LINE

BACKGROUND OF THE INVENTION

1. Field of the Invention

This invention relates to a measuring apparatus which delivers a signal indicative of a measured value to an external device via a signal line, a signal outputting method, and a storage medium storing a program for implementing the method.

2. Prior Art

Conventionally, there has been proposed a counter having a gauge connected thereto for measuring the amount of displacement of an object to be measured, the counter counting pulses of a pulse signal outputted from the gauge and then delivering the count value to an external device at a high speed by parallel transmission via a plurality of signal lines.

According to the counter, in the case of transmitting 6-digit BCD (binary-coded decimal) data in parallel, for instance, four signal lines are used per digit, which means that the parallel transmission requires twenty-four (=6 (digit)×4(lines)) signal lines.

As is apparent from the above case, the conventional counter requires the use of a large number of signal lines for parallel transmission of data, and hence, when a plurality of counters are connected to one sequencer, the handling of signal lines is complicated, which degrades the manipulability of the counters.

To provide a solution to this problem, attempts have been made to substantially reduce the number of signal lines by converting digital data to analog voltage by a D/A converter arranged within a counter, and delivering an analog voltage signal from the D/A converter to an external device via a single signal line.

However, this method of connecting between the counter and the external device by the single signal line to thereby send the analog voltage signal from the former to the latter has not been employed for the signal transmission which requires high accuracy, due to the following disadvantages:

Compared with the dynamic range of the gauge which is capable of measuring the amount of displacement of an object to be measured, with high accuracy, that of the D/A converter for converting digital data to analog voltage is narrower, so that it has conventionally been impossible to obtain analog voltages with a high resolution over the whole measuring range of the gauge.

For instance, assuming that the gauge has a resolution of a minimum travel distance of 0.1 $\mu$m and a whole measuring range of 10 mm, the dynamic range of the gauge is 10 mm/0.1 $\mu$m=100000 (=50 dB), whereas if the D/A converter has a minimum step voltage of 10 mV and a maximum output voltage of 10 V, the dynamic range of the D/A converter is 10 V/10 mV=1000 (=30 dB), which is $\frac{1}{100}$ as large as that of the gauge.

FIG. 1 shows the relationship between the travel distance of the gauge and the output voltage of the D/A converter, according to the prior art. Assuming that a measuring range in which a target voltage 1 is obtained when the travel distance is equal to a target value 1 is set as indicated by "a" in the figure, so long as the travel distance is within the measuring range a, a change in the output voltage relative to a change in the travel distance is large, which enables the measurement of displacement of an object to be measured, with a high resolution, whereas when the travel distance of the gauge reaches a target value 2, the output voltage of the D/A converter has already been saturated, so that it is impossible to obtain an output voltage corresponding to the travel distance.

On the other hand, when the measuring range is set widely as indicated by "b" in the figure, it is possible to obtain the target voltages 1 and 2 corresponding to the respective target values 1 and 2, but a change in the output voltage relative to a change in the travel distance is smaller, which does not allow measurement with a high resolution.

As described above, according to the prior art, the dynamic range of the D/A converter is narrower than that of the gauge. Consequently, when the amount of displacement (travel distance) measured by the gauge is converted to an output voltage by the D/A converter and delivered to the external device via the single signal line, it is impossible to secure a high resolution over the whole measuring range of the gauge.

SUMMARY OF THE INVENTION

It is an object of the invention to provide a measuring apparatus and a signal outputting method which are constructed such that an analog signal indicative of the difference between a target value and a measured value obtained by a gauge is outputted to an external device via a single signal line, while securing a required resolution over the whole measuring range of the gauge, as well as a storage medium storing a program for implementing the signal outputting method.

To attain the above object, according to a first aspect of the invention, there is provided a measuring apparatus comprising a plurality of target value-setting means storing different target values, respectively, target value-selecting means for selecting-at least one target value-setting means from the plurality of target value-setting means, difference-calculating means for calculating a difference between a target value stored in the selected at least one target value-setting means and a measured value of an object to be measured, analog signal conversion means for converting the calculated difference to an analog signal, and output means for outputting the analog signal to an external device via a reduced number of signal lines.

According to the present invention, it is possible to secure a required resolution over the whole measuring range of the gauge in outputting an analog signal to the external device via the single signal line. As a result, the number of signal lines can be reduced, so that when a plurality of measuring apparatuses are connected to an external device via signal lines, the handling of the signal lines is facilitated, which enhances the manipulability of the measuring apparatuses.

Preferably, the analog signal conversion means comprises digital-to-analog conversion means for converting digital data indicative of the calculated difference to an analog voltage signal, and the target value-selecting means selects at least one of the plurality of target value-setting means that stores such a target value that the analog voltage signal is not saturated.

Preferably, the measuring apparatus is connected to a gauge arranged in contact with the object to be measured for displacement together with the object, for outputting a pulse signal indicative of an amount of displacement of the object, and the plurality of target value-setting means store a plurality of respective different target values covering a whole measuring range of the gauge.

Preferably, the target value-selecting means selects one of the plurality of target value-setting means that corresponds to a value of a selection signal from the external device.

Alternatively, the measuring apparatus comprises selection signal-generating means that generates a signal for selecting one of the plurality of target value-setting means, and the target value-selecting means selects one of the plurality of target value-setting means that corresponds to a value of the signal generated by the selection signal-generating means.

Preferably, the output means outputs the analog signal via a single signal line.

To attain the above object, according to a second aspect of the invention, there is provided a signal outputting method comprising the steps of setting a plurality of different target values to a plurality of target value-setting means, respectively, selecting at least one target value-setting means from the plurality of target value-setting means, calculating a difference between a target value stored in the selected at least one target value-setting means and a measured value of an object to be measured, converting the calculated difference to an analog signal, and outputting the analog signal to an external device via a reduced number of signal lines.

To attain the above object, according to a third aspect of the invention, there is provided a machine readable storage medium storing instructions of a program for causing a computer to execute a signal outputting method comprising the steps of setting a plurality of different target values to a plurality of target value-setting means, respectively, selecting at least one target value-setting means from the plurality of target value-setting means, calculating a difference between a target value stored in the selected at least one target value-setting means and a measured value of an object to be measured, converting the calculated difference to an analog signal, and outputting the analog signal to an external device via a reduced number of signal lines.

The above and other objects, features, and advantages of the invention will become more apparent from the following detailed description taken in conjunction with the accompanying drawings.

BRIEF DESCRIPTION OF THE DRAWINGS

FIG. 6 is a graph showing the relationship between the travel distance and the output voltage exhibited when target values are set such that measuring ranges overlap each other.

DETAILED DESCRIPTION OF PREFERRED EMBODIMENTS

The present invention will now be described in detail with reference to the drawings showing embodiments thereof.

Figure 1:
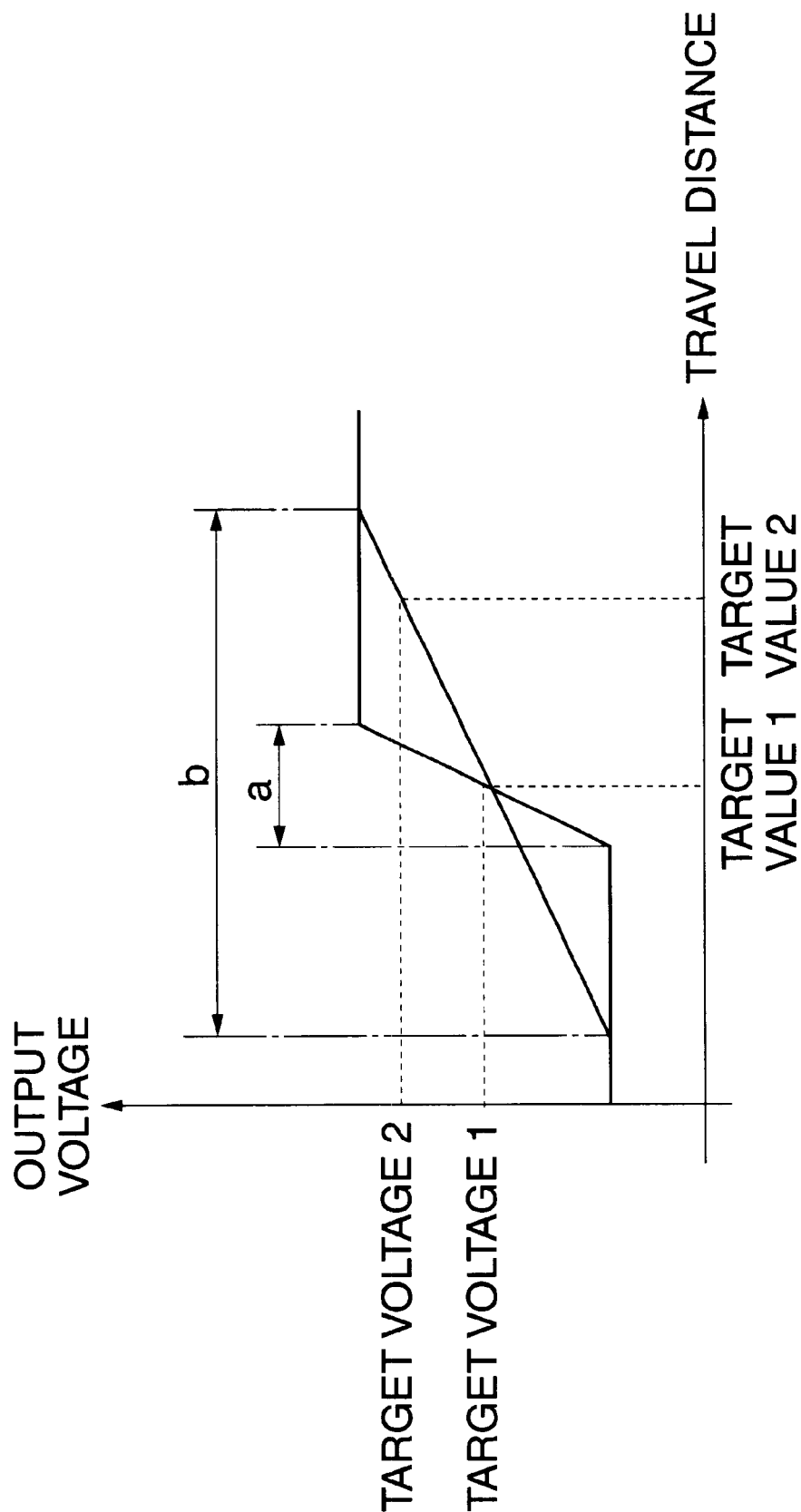
FIG. 1 is a graph showing the relationship between the travel distance of a gauge and the output voltage of a D/A converter, according to the prior art.
Figure 2:
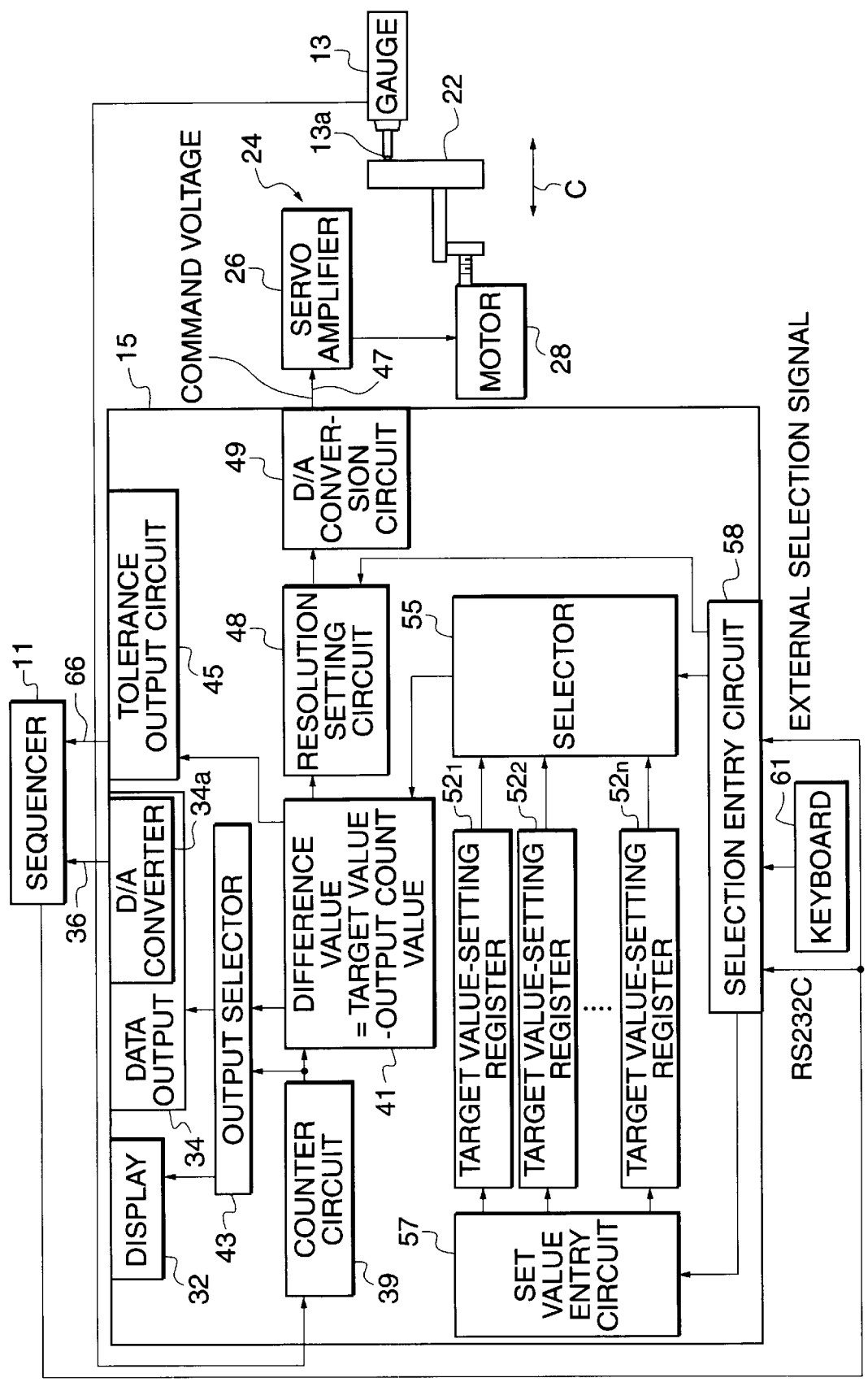
FIG. 2 is a block diagram showing the electrical configuration of a measuring apparatus according to a first embodiment of the present invention, which is applied to a displacement measuring system.

First, description will be made of a measuring apparatus according to a first embodiment of the present invention. FIG. 2 shows the electrical configuration of the measuring apparatus according to the first embodiment, which is applied to a displacement measuring system that measures the amount of displacement of a workpiece positioned by a servo motor. The measuring apparatus according to the first embodiment incorporated in this system is comprised of a counter having a gauge connected thereto.

The displacement measuring system is comprised of a sequencer 11 serving as an automatic control device, a counter 15 that receives a signal from the gauge 13, and a driving system 24 for driving the workpiece 22. The driving system 24 is comprised of a servo amplifier 26, and a motor 28. The servo amplifier 26 drives the motor 28 in response to a command voltage from the counter 15 to move the workpiece 22 in directions indicated by a double-headed arrow c in the figure, for positioning the same.

In the displacement measuring system, the gauge 13 is supported in a predetermined position at the start of measurement of displacement of the workpiece 22, and when a tip 13a of the gauge 13 is brought into contact with the workpiece 22 to be displaced, the gauge 13 delivers a pulse signal indicative of the amount of displacement of the tip 13a to the counter displacement 15. Upon receiving the pulse signal from the gauge 13, the counter 15 delivers measurement data based on the pulse signal and a tolerance-determining output signal to a display 32 of its own and the sequencer 11, and at the same time, outputs a command voltage to the servo amplifier 26.

The gauge 13 is adapted to output signal pulses corresponding in number to the amount of displacement of the tip 13a. As a gauge of this kind, there may be used one having a resolution of 1 μm and a whole measuring range of 10 mm and capable of outputting ten pulses per micrometer, for example. The gauge is not limited to the type which outputs signal pulses corresponding in number to an amount of displacement, but it is possible to employ a gauge which outputs a pulse signal having a repetition period corresponding to an amount of displacement, or alternatively one which outputs digital data indicative of an amount of displacement itself.

The sequencer 11 is used as an automatic control device, as described above, and includes an A/D converter, and an RS232C interface, neither of which is shown. The sequencer 11 is connected to a data output circuit 34 of the counter 15 by a single analog signal line 36, converts an analog voltage signal from the counter 15 to digital data by the A/D converter incorporated therein and at the same time, delivers an RS232C signal and an external selection signal to the counter 15. A personal computer (PC) may be used as the automatic control device in place of the sequencer.

The counter 15 is comprised of a counter circuit 39 that counts pulses of a signal pulse outputted from the gauge 13, to output an output count value, an calculation circuit 41 that calculates a difference value (digital output data) between the output count value and a target value to output the calculated difference value as an output value, an output selector 43 that selects a destination circuit to which the count value and the difference value are to be delivered, the display 32 that displays the difference value, etc., the data output circuit 34 connected to the sequencer 11 via the signal line 36, a tolerance output circuit 45 that carries out tolerance determination and outputs the result of the determination as −NG (smaller than a lower limit of the tolerance), OK (within the tolerance) or +NG (larger than a higher limit of the tolerance), a resolution setting circuit 48 that sets a resolution so as to change the gain of the digital output data outputted from the calculation circuit 41, a D/A conversion circuit 49 that converts the digital output data to an analog voltage (command voltage), a plurality of target value-setting registers $52_1$ to $52_n$ storing respective different target values covering the whole measuring range of the gauge 13, a selector 55 that selects one of the plurality of target value-setting registers $52_1$ to $52_n$, a set value entry circuit 57 for entering target values in the target value-setting registers $52_1$ to $52_n$, respectively, and a selection entry circuit 58 that selectively receives data entered via a keyboard 61, the RS232C signal, and the external selection signal.

The data output circuit 34 includes a D/A converter 34a that converts the digital output data to an analog output voltage and delivers the analog output voltage to the sequencer 11 via the signal line 36.

In the plurality of target value-setting registers $52_1$ to $52_n$, for example, when n=10 holds, a target value is set for each unit of 1 mm so that target values are set for the whole measuring range 10 mm of the gauge 13. The selection entry circuit 58 delivers the entered data or signal to the set value entry circuit 57, the selector 55, and the resolution setting circuit 48.

The display 32 has a 6-digit 7-segment LED and a tolerance determination result-displaying LED. The D/A converter 49 has a resolution of 10 bits and a minimum step voltage of 1 mV, and is capable of outputting a maximum output voltage of 10 V. Similarly, the D/A converter 34a arranged in the data output circuit 34 has a resolution of 10 bits, and a minimum step voltage of 1 mV, and is capable of outputting a maximum output voltage of 10 V.

The single signal line 36 connects between the output terminal of the D/A converter 34a and the input terminal of the A/D converter incorporated in the sequencer 11, and the analog voltage after conversion by the D/A converter 34a is delivered to the A/D converter via the signal line 36. Further, a single analog signal line 47 is connected between the D/A converter 49 and the servo amplifier 26, and the command voltage from the D/A converter 49 is delivered to the servo amplifier 26 via this signal line 47.

The displacement measuring system configured as above requires setting in advance target values according to which the workpiece 22 is to be positioned, over the whole measuring range of the gauge 13, to the target value-setting registers $52_1$ to $52_n$ for storage therein. In setting the target values to the target value-setting registers $52_1$ to $52_n$, the operator enters the target values via an operating panel of the sequencer 11. The sequencer 11 delivers the external selection signal for selecting one of the target value-setting registers $52_1$ to $52_n$ to the counter 15, and at the same time, transmits the RS232C signal indicative of a target value to be set to the selected register 52 to the latter.

In the counter 15, the selector 55 selects a target value-setting register 52 in response to the external selection signal received via the selection entry circuit 58, and the set value entry circuit 57 sets the target value to the target value-setting register 52 selected by the selector 55, in response to the RS232C signal. This setting operation is repeatedly carried out a number of times corresponding to the number of the target value-setting registers $52_1$ to $52_n$, whereby different target values are set to the respective target value-setting registers $52_1$ to $52_n$.

Figure 3:
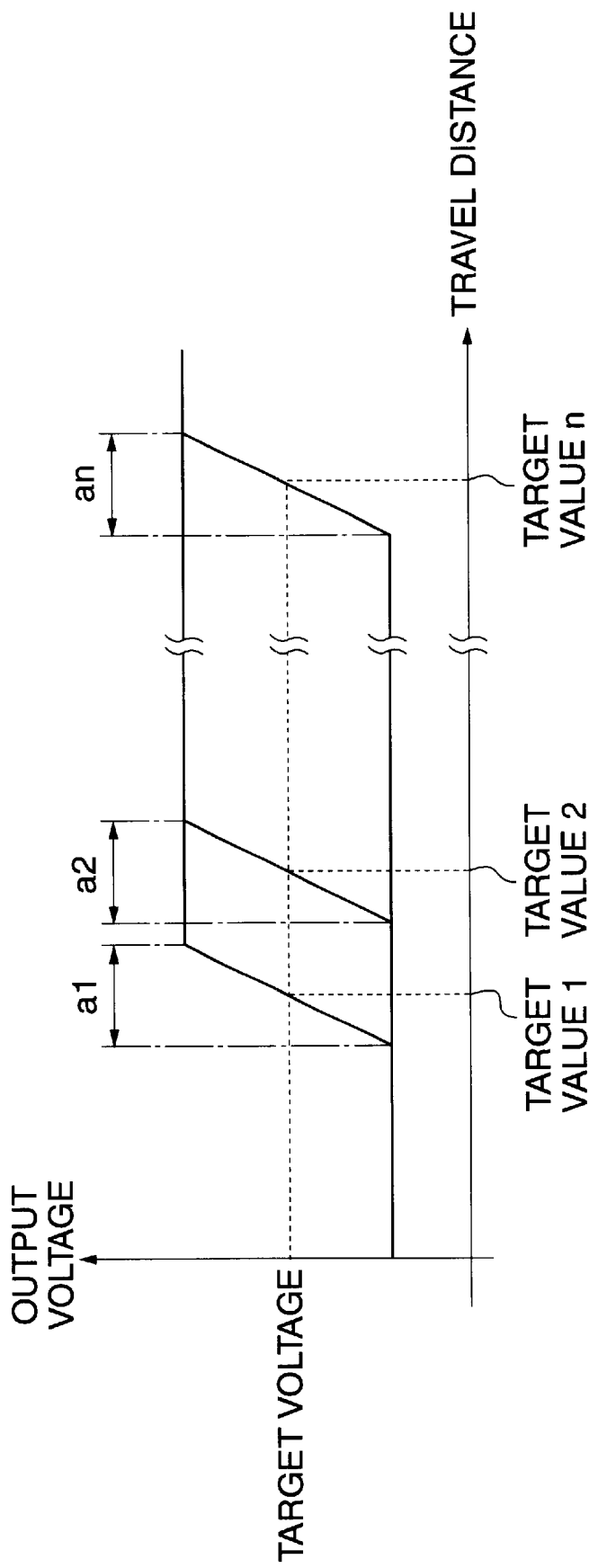
FIG. 3 is a graph showing the relationship between target values, which are stored in target value-setting registers, the travel distance of a gauge, and the output voltage of the D/A converter.

FIG. 3 shows the relationship between the target values set and stored in the respective target value-setting registers $52_1$ to $52_n$, the travel distance of the gauge, and the output voltage of the D/A converter 34a or 49. In the figure, the abscissa indicates the travel distance of the gauge which corresponds to the amount of displacement of the workpiece to be measured, while the ordinate indicates the output voltage of the D/A converter 34a or 49. When the target value-setting register $52_1$ is selected by the selector 55, the measuring range of the gauge 13 is set as indicated by a symbol $a_1$ in the figure. Similarly, when the target value-setting register $52_2$ is selected by the selector 55, the measuring range of the gauge 13 is set as indicated by a symbol $a_2$. Further, when the target value-setting register $52_n$ is selected, the measuring range is set as indicated by a symbol $a_n$.

Target voltages corresponding to the respective target values 1 to n are set to the same value. That is, whichever target value-setting register may be selected, the same voltage value is used as the target voltage. On the other hand, the measuring ranges $a_1$ to $a_n$ are set correspondingly, respectively, to a plurality of divided ranges of the whole measuring range of the gauge 13. Therefore, a change in the output voltage of the D/A converter relative to a change in the travel distance of the gauge 13 within each measuring range is large, which makes it possible to obtain an output voltage having a high resolution.

Next, description will be made of the operation of measuring the amount of displacement. Prior to the start of the measuring operation, the operator instructs a target value to the sequencer 11. The sequencer 11 delivers the external selection signal for causing selection of the instructed target value to the selection entry circuit 58 of the counter 15. In response to the external selection signal sent from the selection entry circuit 58, the selector 55 selects a target value-setting register 52 corresponding to the target value. It should be noted that immediately after the power is turned on or when no external selection signal has been received, a target value-setting register corresponding to a default or a target value-setting register selected in the immediately preceding measuring operation may be selected.

When the measurement is started, the counter circuit 39 counts pulses of the pulse signal indicative of the amount of displacement of the workpiece 22 transmitted from the gauge 13. The calculation circuit 41 calculates the difference between the count value and the target value set in the target value-setting register 52 selected by the selector 55 and delivers the calculated difference as an output value (digital output data) to the output selector 43 and the resolution setting circuit 48.

The output selector 43 selects one of the count value from the counter circuit 39 and the output value from the calculation circuit 41, and delivers the selected value to the display 32 or the data output circuit 34. This selection may be effected by an instruction by the operator or a timer, not shown. The display 32 displays the count value or the output value on the 6-digit 7-segment LED.

The data output circuit 34 converts the output value (digital output data) to an analog voltage signal by the D/A converter 34a incorporated therein. The analog voltage signal is delivered to the A/D converter of the sequencer 11 via the signal line 36 connected to the output terminal of the data output circuit 34. Thus, a high-accuracy output voltage corresponding to the difference between the measured value and the target value is delivered to the sequencer 11 via the analog signal line 36.

The tolerance output circuit 45 carries out the tolerance determination by comparing the output value from the calculation circuit 41 with two reference values, and delivers a result of the tolerance determination, which is obtained as +NG, OK or −NG, to the sequencer 11 via the signal line 66.

Further, the output value (digital output data) from the calculation circuit 41 is delivered to the D/A converter 49 via the resolution setting circuit 48. The D/A converter 49 converts the digital output data to an analog voltage signal, and the analog voltage signal is delivered as a command voltage to the servo amplifier 26 via the signal line 47. The servo amplifier 26 drives the motor 28 according to the command voltage. Thus, a high-accuracy analog voltage signal (command voltage) corresponding to the difference between the measured value and the target value is delivered to the servo amplifier 26 via the signal line 47. By execution of such servo control, the workpiece 22 is accurately positioned to a position corresponding to the target value.

The operator can change the target value for use in positioning the workpiece 22 simply by designating a target value-setting register other than the one storing the present target value, which makes it possible to carry out another measuring operation in the same manner as described above.

By carrying out similar measuring operations repeatedly, it is possible to secure a required resolution over the whole measuring range of the gauge 13. Therefore, the present embodiment requires no more than the two signal lines 36, 47 to deliver output voltages, respectively, from the counter 15 to the sequencer 11 and from the counter 15 to the servo amplifier 26. Thus, the number of the signal lines can be considerably reduced, compared with the number of the signal lines (e.g. 6 digits×4 bits=24 lines in BCD output) required in the prior art, which facilitates handling of the signal lines, thereby enhancing the manipulability of the measuring apparatus.

Next, a second embodiment of the present invention will be described. The second embodiment is distinguished from the first embodiment in which the counter 15 is comprised of hardware components, in that the functions of a counter as a measuring apparatus according to the second embodiment are implemented by software control.

Figure 4:
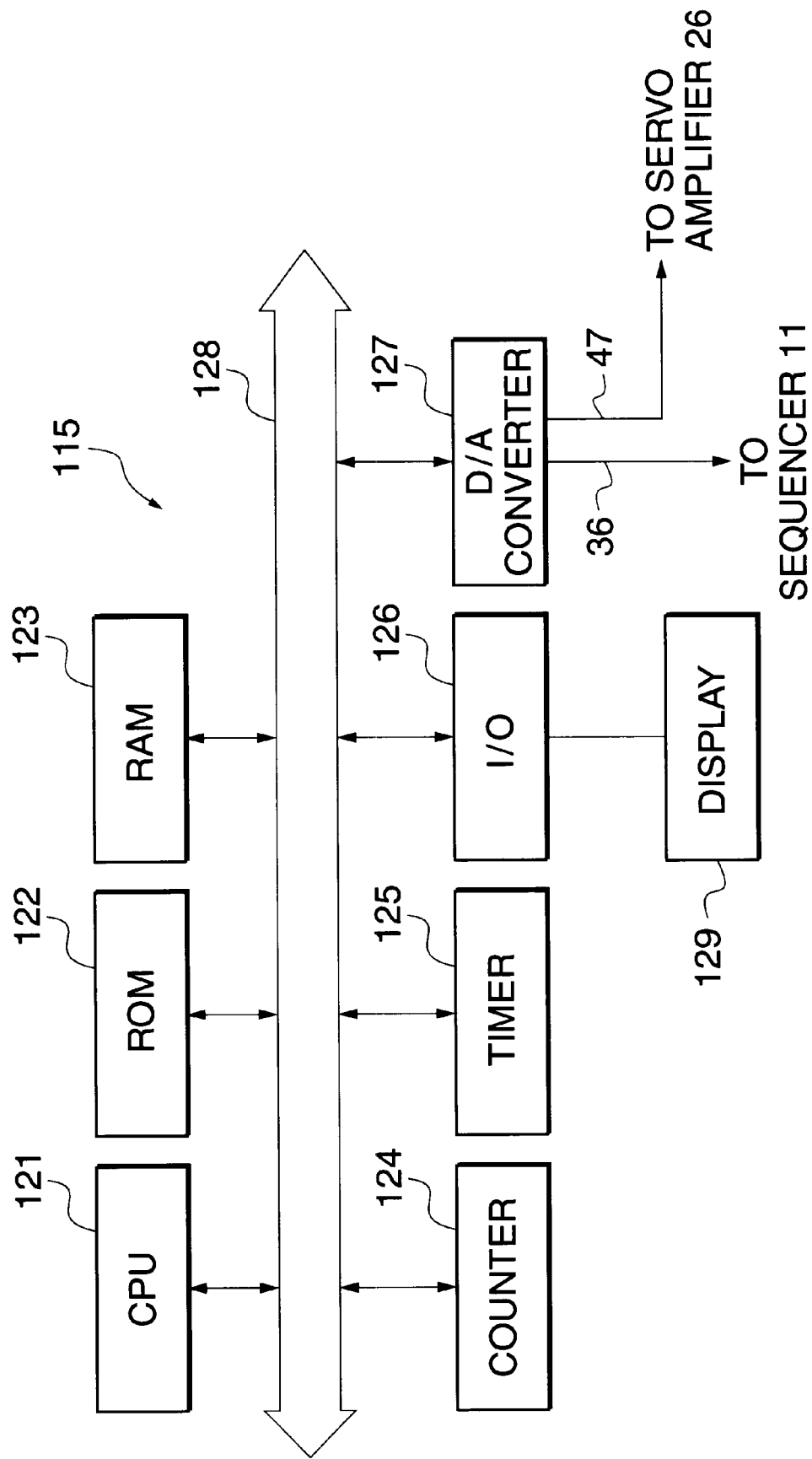
FIG. 4 is a block diagram showing the electrical configuration of a measuring apparatus according to a second embodiment of the present invention.

FIG. 4 shows the electrical configuration of the counter as a measuring apparatus according to the second embodiment. Component parts and elements similar to those of the first embodiment are designated by identical reference numerals. The counter 115 is formed by an ordinary personal computer and comprised of a CPU 121, a ROM 122, a RAM 123, a counter circuit 124, a timer 125, a D/A converter 127 and an I/O interface 126, all of which are connected to each other by a bus 128. A display 129 is connected to the I/O interface 126. The D/A converter 127 has the same characteristic as described in the first embodiment with reference to FIG. 3. The D/A converter 127 is connected to the sequencer 11 as used in the first embodiment via the single analog signal line 36 as well as to the servo amplifier 26 via the single analog signal line 47. The ROM 122 stores control programs for implementing the functions of the component parts of the first embodiment, and a measurement process program, described in detail hereinafter. The CPU executes these programs to thereby implement the functions of the component parts of the counter 115.

Figure 5:
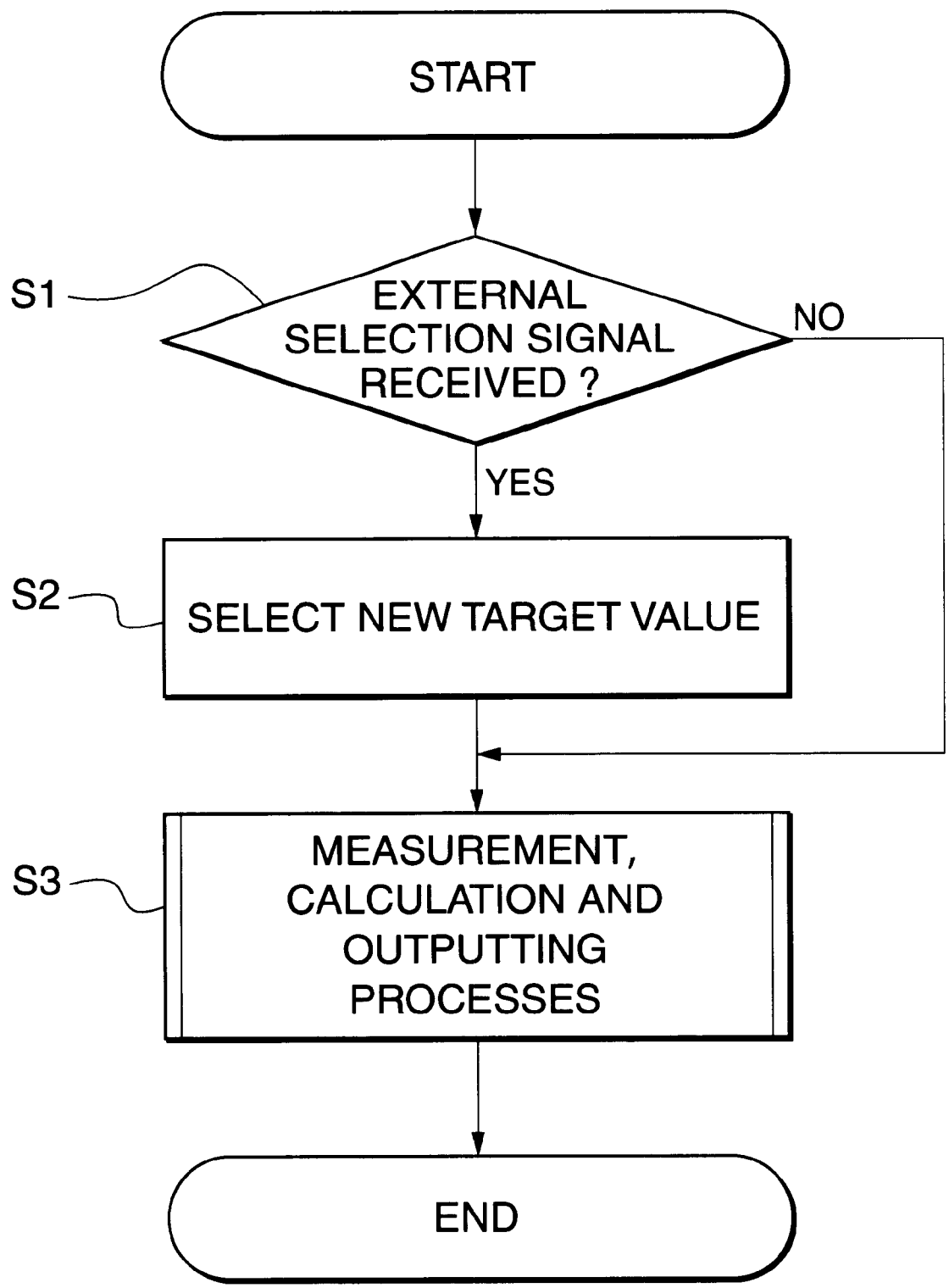
FIG. 5 is a flowchart showing a measurement process which is executed by a measurement process program.

FIG. 5 shows a routine executed according to the measurement process program. The measurement process program, which is stored in the ROM 122 as described above, is started in response to the RS232C signal from the sequencer 11 and executed by the CPU 121.

Prior to the execution of the measurement process, similarly to the first embodiment, the sequencer 11 delivers the RS232C signal via the I/O interface 126 to store target values set to respective different values, in a plurality of target value-setting areas assigned to predetermined areas within the RAM 123.

When the measurement process is started, first, it is determined at a step S1 whether or not the external selection signal has been received from the sequencer 11 via the I/O interface 126. If the external selection signal has been received from the sequencer 11, a new target value stored in a target value-setting area corresponding to the external selection signal is selected at a step S2. On the other hand, if no external selection signal has been received at the step S1, a target value employed in execution of the immediately preceding loop of the measurement process program is selected without selecting a new target value.

After the target value has been selected, measurement, calculation and outputting processes are executed at a step S3, followed by terminating the program. In the measurement, calculation and outputting processes, pulses of the pulse signal received from the gauge 13 via the I/O interface 126 are counted by the counter circuit 124 in response to a command from the CPU 121, and then the CPU 121 calculates the difference between the count value and the target value stored in the target value-setting area corresponding to the external selection signal and delivers the calculated difference (digital output data) as an output value to the D/A converter 127. The D/A converter 127 converts the output value to an analog output voltage, and delivers the analog output voltage to the sequencer 11 via the analog signal line 36 connected to the output terminal of the D/A converter 127. The sequencer 11 converts the received analog output voltage to digital data by an A/D converter, not shown, and carries out various processes based on the digital data.

At the same step S3, the CPU 121 causes the display 129 to display the calculated difference on a 7-segment LED thereof. Further, the CPU 121 carries out a tolerance determination by comparing the output value with two reference values, and then delivers a result of the determination, which is obtained as +NG, OK or −NG, to the sequencer 11 via the I/O interface 126 and the signal line 66.

The analog voltage signal (command voltage) after the conversion by the D/A converter 127 is also delivered to the servo amplifier 26 via the single signal line 47. The servo amplifier 26 drives the motor 28 according to the command voltage to position a workpiece based on the target value.

As described above, according to the second embodiment, the functions of the component parts of the counter according to the first embodiment are implemented by software control. Therefore, the second embodiment cannot only provide the same effects as obtained by the first embodiment, but can also easily comply with various changes in the specification.

Although in the above embodiments, the operator gives instructions for setting, selecting a target value to the counter 15 or 115, etc. via the sequencer 11, this is not limitative but a presetter may be connected to the counter 15 or 115 to give such instructions directly to the latter by entry of numerical values.

Further, although in the above embodiments, the operator designates a target value for selection of the same, selection of a target value may be carried out automatically by the counter. For instance, when the position of a workpiece measured by the gauge is sequentially changed, a target value may be automatically selected in response to a switching signal generated within the counter in a manner corresponding to each measured position. Alternatively, each target value may be automatically selected in response to a switching signal generated whenever the timer incorporated in the counter measures or counts a predetermined time.

It is also possible to select a target value automatically by causing a switching signal to be generated within the counter whenever the analog output voltage from the D/A converter reaches a saturation area (see FIG. 3). In this case, alternatively to the case shown by the FIG. 3 graph in which the target values are set such that the measuring ranges $a_1$ to $a_n$ do not overlap each other, target values may be set such that the resulting measuring ranges overlap each other to some extent. FIG. 6 shows the relationship between the travel distance and the output voltage in the case of the target values being set such that the measuring ranges overlap each other. By setting the target values such that the measuring ranges overlap each other to some extent as indicated by a hatched area in the figure, it is possible to carry out a continuous measurement with a high resolution over the whole measuring range of the gauge.

The present invention is by no means limited to the configurations according to the above embodiments, but it is applicable to any configuration which can achieve functions shown in the appended claims or the functions of the configuration of the above embodiments.

For instance, although in the above embodiments, the servo amplifier drives the motor in response to the command voltage delivered from the counter, this is not limitative but the motor may be driven in response to a command voltage from the sequencer instead. In this case, the counter is used exclusively for its intrinsic function of measuring the amount of displacement.

Further, although in the above embodiments, the measuring apparatus of the present invention is applied to the displacement measuring system for measuring the amount of displacement of a workpiece by the gauge, this is not limitative, but the present invention is applicable to any measuring system which calculates the difference between a measured value and a target value and converts digital data indicative of the difference to an analog voltage signal. Therefore, the present invention may be applied to a system for measuring a physical quantity, such as temperature and pressure.

Moreover, although in the above embodiments, digital data is converted to an analog voltage by using the D/A converter, insofar as a pulse signal is measured, a measured value of which is reflected in a repetition period thereof, an F/V converter (frequency-to-voltage converter) may be used for conversion of the digital data to an analog voltage, whereby it is possible to carry out measurement similarly to the case where the D/A converter is employed.

What is claimed is:

1. A measuring apparatus comprising:
   a plurality of target value-setting means storing different target values, respectively;
   target value-selecting means for selecting at least one target value-setting means from the plurality of target value-setting means;
   difference-calculating means for calculating a difference between a target value stored in said selected at least one target value-setting means and a measured value of an object to be measured;
   analog signal conversion means for converting the calculated difference to an analog signal; and
   output means for outputting the analog signal to an external device via a reduced number of signal lines.

2. A measuring apparatus according to claim 1, wherein said analog signal conversion means comprises digital-to-analog conversion means for converting digital data indicative of the calculated difference to an analog voltage signal, and
   wherein said target value-selecting means selects at least one of the plurality of target value-setting means, the at least one of the plurality of target value-setting means that stores such a target value that the analog voltage signal is not saturated.

3. A measuring apparatus according to claim 1, connected to a gauge arranged in contact with said object to be measured for displacement together with said object, for outputting a pulse signal indicative of an amount of displacement of said object, and
   wherein the plurality of target value-setting means store a plurality of respective different target values covering a whole measuring range of said gauge.

4. A measuring apparatus according to claim 1, wherein said target value-selecting means selects one of the plurality of target value-setting means that corresponds to a value of a selection signal from said external device.

5. A measuring apparatus according to claim 1, including selection signal-generating means that generates a signal for selecting one of the plurality of target value-setting means, and
   wherein said target value-selecting means selects one of the plurality of target value-setting means that corresponds to a value of the signal generated by said selection signal-generating means.

6. A measuring apparatus according to claim 1, wherein said output means outputs said analog signal via a single signal line.

7. A signal outputting method comprising the steps of:
   setting a plurality of different target values to a plurality of target value-setting means, respectively;
   selecting at least one target value-setting means from the plurality of target value-setting means;
   calculating a difference between a target value stored in the selected at least one target value-setting means and a measured value of an object to be measured;
   converting the calculated difference to an analog signal; and
   outputting the analog signal to an external device via a reduced number of signal lines.

8. A machine readable storage medium storing instructions of a program for causing a computer to execute a signal outputting method comprising the steps of:
   setting a plurality of different target values to a plurality of target value-setting means, respectively;
   selecting at least one target value-setting means from the plurality of target value-setting means;
   calculating a difference between a target value stored in the selected at least one target value-setting means and a measured value of an object to be measured;
   converting the calculated difference to an analog signal; and
   outputting the analog signal to an external device via a reduced number of signal lines.

* * * * *